(12) United States Patent
Roy et al.

(10) Patent No.: US 8,127,409 B2
(45) Date of Patent: Mar. 6, 2012

(54) SAFETY BELT RELEASE MECHANISM

(76) Inventors: Julien Edwin Roy, Lafayette, LA (US);
Douglas Clifton Cruthirds, Biloxi, MS (US)

( * ) Notice: Subject to any disclaimer, the term of this patent is extended or adjusted under 35 U.S.C. 154(b) by 0 days.

(21) Appl. No.: 12/979,045

(22) Filed: Dec. 27, 2010

(65) Prior Publication Data

US 2011/0302751 A1    Dec. 15, 2011

Related U.S. Application Data

(63) Continuation-in-part of application No. 12/907,747, filed on Oct. 19, 2010, now Pat. No. 7,941,902.

(60) Provisional application No. 61/397,274, filed on Jun. 10, 2010.

(51) Int. Cl.
*A44B 11/25* (2006.01)

(52) U.S. Cl. ............................................. 24/602; 24/652

(58) Field of Classification Search .................... 24/602, 24/603, 652; 297/468, 482–484; 280/801.1, 280/802, 808; 180/268; 403/32
See application file for complete search history.

(56) References Cited

U.S. PATENT DOCUMENTS

| | | | |
|---|---|---|---|
| 3,314,088 A | 4/1967 | Nordhaus et al. | |
| 3,500,510 A | 3/1970 | Gaione | |
| 3,581,352 A | 6/1971 | Lavin | |
| 4,014,080 A | 3/1977 | Caradec | |
| 4,488,691 A | 12/1984 | Lorch | |
| 4,589,172 A | 5/1986 | Hoenigs et al. | |
| 4,738,413 A | 4/1988 | Spinosa et al. | |
| 5,165,498 A | 11/1992 | Garboli et al. | |
| 5,243,710 A * | 9/1993 | Craycroft | ........................ 2/312 |
| 5,765,660 A | 6/1998 | Ambrosi | |
| 5,857,246 A | 1/1999 | Becnel | |
| 6,123,166 A | 9/2000 | Verellen | |
| 6,930,611 B1 | 8/2005 | Van Druff et al. | |
| 7,201,248 B1 | 4/2007 | Shaw | |
| 7,941,902 B1 * | 5/2011 | Roy et al. | ........................ 24/602 |
| 2008/0116681 A1 | 5/2008 | Van Rooyen | |

FOREIGN PATENT DOCUMENTS

DE    2734541 A  *  2/1979
EP    405654 A2  *  1/1991

OTHER PUBLICATIONS

Website, http://www.martin-baker.com/products/Restraint-Systems.aspx, Martin-Baker Water Activated Release System, two sheets printed from the internet on Sep. 2, 2010.

* cited by examiner

*Primary Examiner* — James Brittain
(74) *Attorney, Agent, or Firm* — Richard C. Litman

(57) ABSTRACT

The safety belt release mechanism includes sensor and belt release components. The sensor is installed at a low point within the vehicle. The sensor contains water-soluble material that retains a spring in compression so long as the water-soluble material is dry. If the vehicle is immersed in water, the water-soluble material dissolves, releasing the spring. In one embodiment, the spring drives a pin into a pressurized gas (e.g., $CO_2$) cartridge, releasing the gas therein. The gas passes through a tube to the belt release component installed upon a belt latch mechanism, driving a pin from an engaged position in the latch to release the latch. In another embodiment, the spring acts directly to drive the latch pin from the engaged position to release the latch. While one such assembly is disclosed herein, it is most preferred that one such assembly be installed along each safety belt assembly of the vehicle.

16 Claims, 6 Drawing Sheets

SAFETY BELT RELEASE MECHANISM

CROSS-REFERENCE TO RELATED APPLICATION

This application is a continuation-in-part of U.S. patent application Ser. No. 12/907,747, filed on Oct. 19, 2010, now U.S. Pat. No. 7,941,902, which claims the benefit of U.S. Provisional Patent Application Ser. No. 61/397,274, filed Jun. 10, 2010.

BACKGROUND OF THE INVENTION

1. Field of the Invention

The present invention relates generally to seat belt systems, and particularly to a safety belt release mechanism that is activated by immersion in water to release the occupants of a motor vehicle from their seats in the event the vehicle is submerged in a body of water.

2. Description of the Related Art

A number of tragic accidents have occurred over the years when motor vehicles have ended up at least partially submerged in a body of water. Such a situation may be due to the failure of a parking brake, a collision, or loss of control of the vehicle, among various potential causes. In many instances the vehicle is relatively undamaged and the occupants may be physically capable of escape, but their seat belt systems may be locked or there may be too much pressure on the belt to allow the occupant(s) to unlatch the latch(es).

Thus, a safety belt release mechanism solving the aforementioned problems is desired.

SUMMARY OF THE INVENTION

The safety belt release mechanism includes a sensor component and a belt release component. The sensor component is installed at some low point within the vehicle structure, and includes a water-soluble substance (e.g., bicarbonate of soda, etc.) that retains a spring in compression when the substance is dry. When the water-soluble material dissolves, the spring is released and drives a pin into a gas cartridge (e.g., carbon dioxide, $CO_2$) to release the pressurized gas within the cartridge.

The gas is transmitted under pressure through a flexible tube or line to the belt release component, which is secured to a belt latch assembly installed along the belt. The belt latch assembly to which the belt release component is installed is a separate latch assembly from the conventional manually operated latch, and is preferably located at some point adjacent one of the belt anchors in the vehicle.

If the vehicle becomes immersed in water, water enters the sensor unit to dissolve the water-soluble material therein so that the spring drives a pin into the penetrable seal of a pressurized gas cartridge (e.g., $CO_2$, etc.). The gas from the cartridge travels through a flexible line or tube to the belt release component and drives a pin from the latch assembly to release the belt portions.

A second embodiment of the safety belt release mechanism avoids the use of a pressurized gas cylinder for activation of the device. The sensor component with its water-soluble material is installed directly to the latch assembly, and the spring is installed within the sensor component, urging the belt latch pin outwardly from the latch assembly. When the water-soluble material dissolves, the spring expands to pull the pin from the latch assembly, thereby releasing the belt.

Any number of such installations may be provided in a motor vehicle. At least one such installation is provided in the driver's seat belt to allow the driver (if capable) to assist any other occupants of the vehicle after release of the driver's belt. Most preferably, however, a separate sensor and belt release system is installed in each safety belt of the vehicle. In the case of the first embodiment, a plurality of sensor units may be installed with each actuator, the sensors being disposed in different locations in the vehicle to assure belt release regardless of the orientation of the vehicle when it comes to rest in a body of water.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The safety belt release mechanism is designed for installation in the seat belt assembly of a motor vehicle. The mechanism is automatically activated to separate two belt portions from one another in the event the device is immersed in water in order to free the occupant restrained by the belt assembly, as when the motor vehicle plunges into a body of water in the event of an accident.

Figure 1:
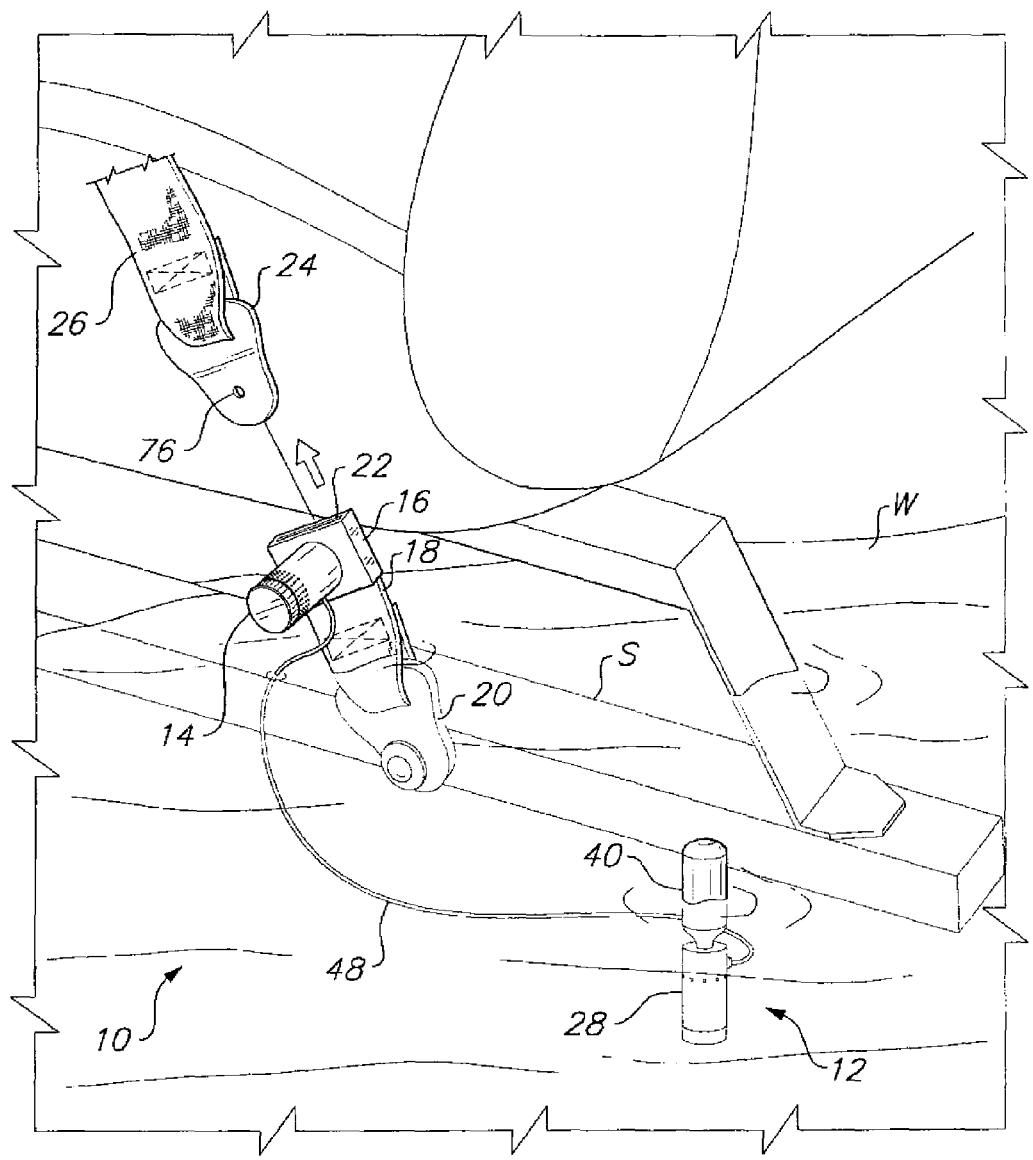
FIG. 1 is an environmental, perspective view of a safety belt release mechanism according to the present invention.

FIG. 1 of the drawings provides an environmental perspective view of a first embodiment of the automated safety belt release mechanism 10 in an exemplary installation in a motor vehicle. The mechanism 10 is shown activated due to its immersion in water W in FIG. 1. The primary components of the system or mechanism 10 comprise a completely automated, water-activated sensor component 12 that is installed at some low point in the vehicle, and an actuator component 14 that is installed on the first latch component 16 of the belt assembly to communicate pneumatically with the sensor component 12. The first latch component 16 is, in turn, attached to a relatively short first or anchor belt portion 18, which extends from a safety belt anchor bracket 20 attached (e.g., bolted, etc.) to the seat support or other structure S of the vehicle. Alternatively, the first latch component 16 and its actuator component 14 may be constructed as an integral part of the safety belt anchor bracket 20, and the short first or anchor belt portion may be eliminated, if desired.

The first latch component 16 has a receptacle or slot 22 therein to accept the tongue or tab configuration of the second latch component 24. The second latch component 24 extends from the second safety belt component 26 and serves to connect the first and second belt components 18 and 26 directly to one another during normal operation.

Figure 2:
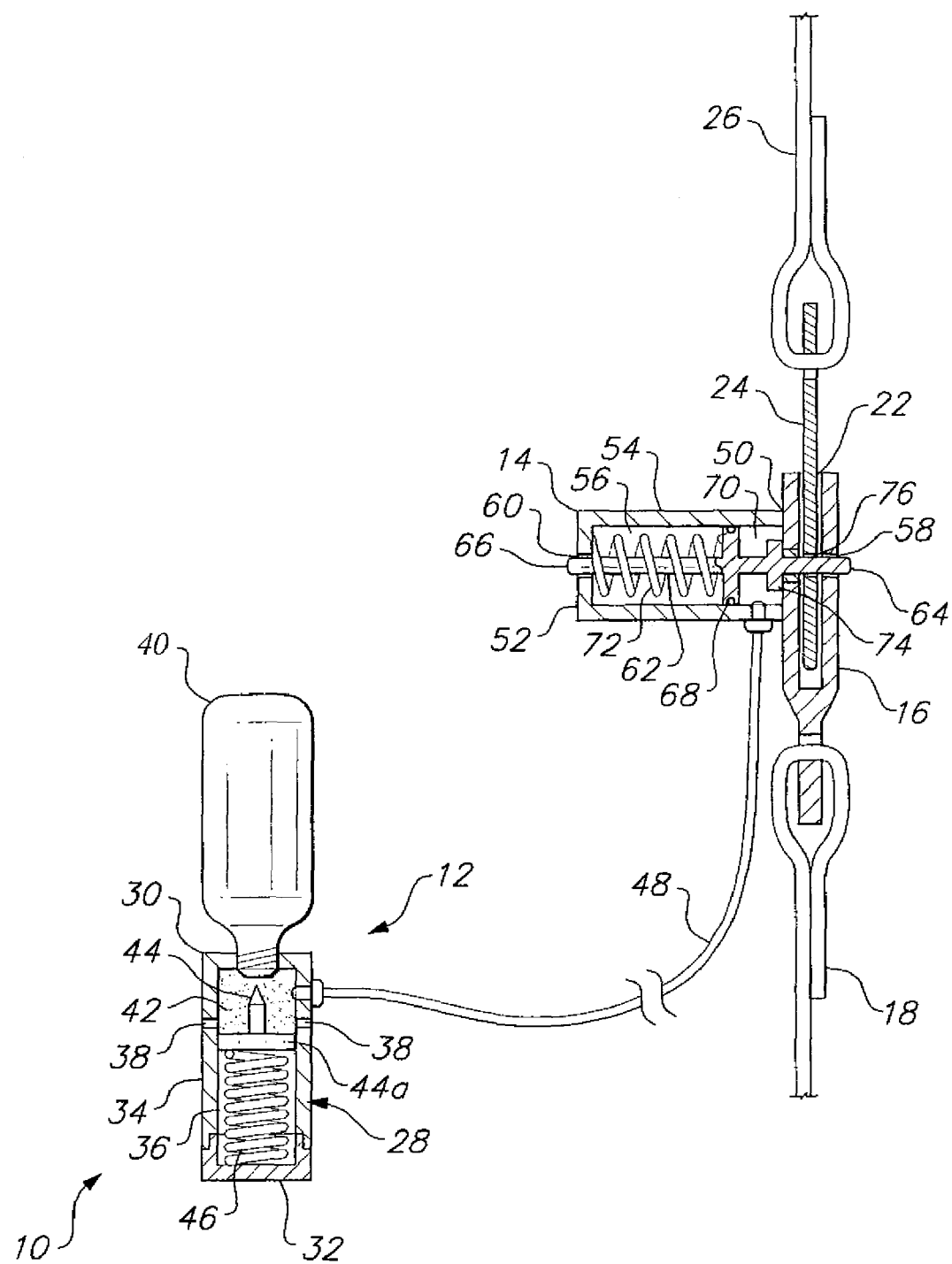
FIG. 2 is an elevation view in section of the mechanism of FIG. 1 in its armed state, illustrating various details thereof.
Figure 3:
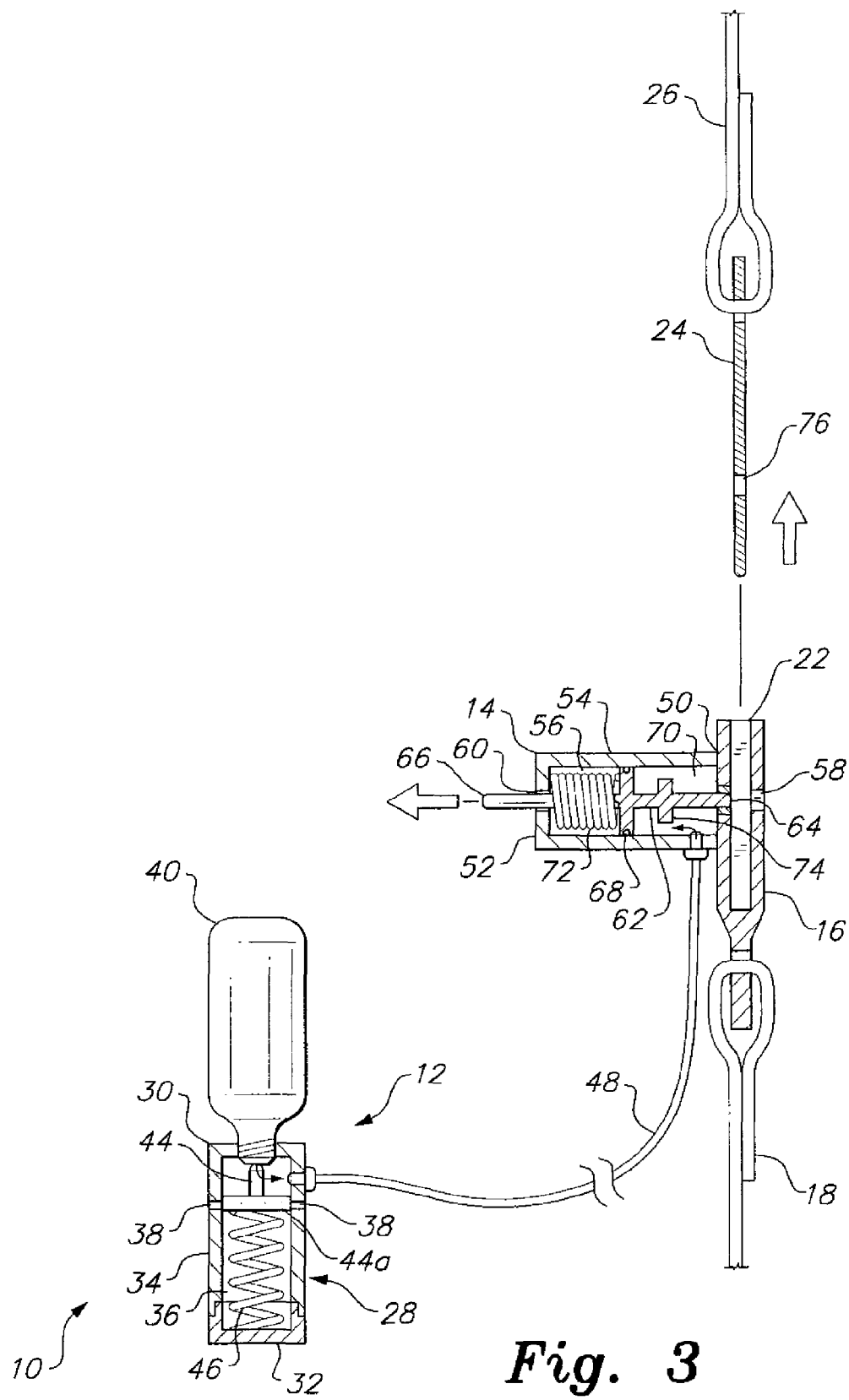
FIG. 3 is an elevation view in section of the mechanism of FIGS. 1 and 2 in its activated configuration, illustrating the operation thereof.

FIGS. 2 and 3 provide elevation views in section of the mechanism or system 10 in its normal, non-activated (connected) state and its activated (belt separation) state, respectively. The sensor unit or component 12 comprises a sensor body 28 having opposite first and second ends 30 and 32 and a wall 34 extending between the two ends 30, 32. The first and second ends 30, 32 and the wall 34 of the sensor body 28 define an interior chamber 36. At least one water passage 38 (and preferably a plurality of such passages) extends through the wall 34 to allow water to flow into the interior chamber 36 when the sensor unit 12 is submerged.

A pressurized gas cartridge 40 (e.g., a $CO_2$ cartridge) extends from the first end 30 of the sensor body 28. The neck of the cartridge 40 extends into the interior chamber 36, and defines a mouth closed by a penetrable seal. A water-soluble material 42 (e.g., bicarbonate of soda, etc.) is placed within the interior chamber 36, adjacent the first end 30 of the sensor body 28. A cartridge-penetrating pin 44 is installed within the interior chamber 36, and is oriented toward the penetrable seal of the pressurized gas cartridge 40. A compression spring 46 is installed within the interior chamber 36 adjacent the second end 32 of the sensor body 28, and is biased against the wider head 44a of the pin 44 to urge the pin toward the gas cartridge 40. However, the pin 44 is restricted from penetrating the end of the cartridge 40 by the water-soluble material 42, which is located within the interior chamber 36 between the pin 44 and the first end 30 of the sensor body 28. Thus, the pressurized gas cartridge 40 cannot be punctured to allow the gas to escape to the belt release actuator component 14 through the interconnecting flexible pneumatic tube or line 48 unless and until the water-soluble material is dissolved and/or washed from the interior chamber 36 of the sensor body 28.

Although it is not anticipated that the automatic safety belt release mechanism 10 would be reused in a motor vehicle, the mechanism 10 may be configured to allow it to be reworked for reuse, if so desired. It will be seen that the second end 32 of the sensor unit 12 may comprise a separable cap (e.g., a threaded cap) that may be removed and replaced. Also, the pressurized gas cartridge 40 may be removed from the opposite first end 30 of the sensor unit 12. Accordingly, the depleted cartridge 40 may be replaced with a fresh, fully charged cartridge, and the cap at the second end 32 of the sensor unit 12 may be removed to access the interior chamber 36 of the sensor unit 12. The spring 46 and the pin 44 are removed, and a fresh charge of water-soluble material is placed within the first end 30 of the sensor unit 12. The pin 44 and the spring 46 are then replaced in proper order, and the cap at the second end 32 is replaced to ready the sensor unit 12 for reuse.

The actuator unit 14 that extends from the first latch component 16 includes a latch attachment end 50, an opposite spring housing end 52, and a wall 54 extending therebetween. The latch attachment end 50 of the actuator 14 may comprise a portion of the surface of the first latch component 16, if so desired. The latch attachment end 50, spring housing end 52, and wall 54 define an interior chamber 56 within the actuator unit 14. The latch attachment end 50, i.e., the mating surface of the first latch component 16, has a latch pin passage 58 formed therethrough that continues concentrically through the opposite side of the first latch component 16. The opposite spring housing end 52 of the actuator unit 14 also has a corresponding latch pin passage 60 formed therethrough, the latch pin passages 58 and 60 being concentric with one another.

A latch pin 62 extends concentrically through the latch pin passages 58 and 60 of the actuator component or unit 14. The latch pin 62 has a latch-securing end 64 extending from the latch attachment end 50 of the actuator 14 when the mechanism 10 is armed, and an opposite guide end 66 extending from the spring housing end 52 of the actuator. The latch pin 62 further has a generally medially located sealing disc 68 disposed concentrically therearound, the sealing disc 68 defining a pneumatic chamber 70 between the disc 68 and the latch attachment end 50 of the actuator 14. A spring 72 is installed about the latch pin 62 between the spring housing end 52 of the actuator 14 and the sealing disc 68 of the latch pin 62. The spring 72 urges the sealing disc 68, and thus the latch pin 62, toward the first latch component 16 to extend the latch-securing end 64 of the latch pin 62 outwardly from the actuator 14. A stop 74 is disposed upon the latch pin 62 to limit the extension of the latch-securing end 64 of the latch pin 62.

The mechanism or system 10 is normally configured, as shown in FIG. 2, with the latch-securing end 64 of the latch pin 62 extended through the latch pin passage 58 of the first latch component 16 and the corresponding concentric latch pin passage 76 of the second latch component 24 installed within the receptacle 22 of the first latch component 16. The latch pin 62 in its extended state, as shown in FIG. 2, thus secures the two latch components 16 and 24 together to join the two belt portions 18 and 26.

However, when the sensor unit or component 12 is immersed in water, as when the motor vehicle is at least partially submerged, water enters the interior chamber 36 of the sensor body 28 through the water inlet passages 38 to dissolve and/or wash out the water soluble material 42 therein. When this material 42 is removed from the internal volume between the first end 30 and the head 44a of the pin 44 within the sensor body 28, the spring 46 extends to force the pin 44 into the penetrable seal in the end or mouth of the neck of the pressurized gas cartridge 40, generally as shown in FIG. 3. This allows the pressurized $CO_2$ or other gas within the cartridge to escape through the flexible pneumatic line 48 that connects the sensor 12 to the actuator 14. The gas cannot escape from the water inlet passages 38 through the wall 34 of the sensor body 28 because the head 44a of the pin 44 is pushed by the spring 46 to a position blocking the passages 38, as shown in FIG. 3.

As the gas flows through the line or tube 48 into the pneumatic chamber 70 of the actuator unit 14, the increasing pressure drives the sealing disc 68 toward the spring housing end 52 of the actuator 14, compressing the spring 72 therein. Since the sealing disc 68 is an integral and fixed component of the latch pin 62, the latch securing end 64 of the pin 62 travels with the disc 68, retracting from its normally extended position through the latch pin passages 58 and 76, respectively, of the first latch component 16 and second latch component 24. This allows the second latch component 24 to release from its position in the receptacle 22 of the first latch component 16, thus releasing the two belt portions 18 and 26 to allow an occupant restrained thereby to escape the vehicle. A supplemental spring may be placed at the bottom of the receptacle 22 of the first latch component 16 to eject the second latch component 24 therefrom, if desired, but the normal tension on the belt assembly as assisted by any retractors or tensioners in the system will normally provide sufficient tensile force on the belt system to separate the two belt components from one another when the latch pin 62 is withdrawn from the latch components 16 and 24.

While only a single belt release mechanism 10 is illustrated and described herein, it should be noted that most preferably one such system or mechanism is installed at each safety or seat belt position within the vehicle. It should also be noted that while only a single actuator is shown and described for the mechanism 10, additional actuators may be provided at various locations in order to assure belt release regardless of the orientation of the vehicle when it comes to rest in a body of water. For example, a second actuator (for each belt assembly) may be installed in or near the roof of the vehicle to actuate the belt release mechanism if the vehicle were to overturn in a relatively shallow body of water, e.g., submerging the inverted vehicle from roof to window line on the doors. A trapped occupant restrained by his or her belts in such a situation might drown if otherwise unable to escape by releasing his or her seatbelt assembly. Accordingly, such a system will provide a measure of safety not previously found in conventional motor vehicles.

Figure 4:
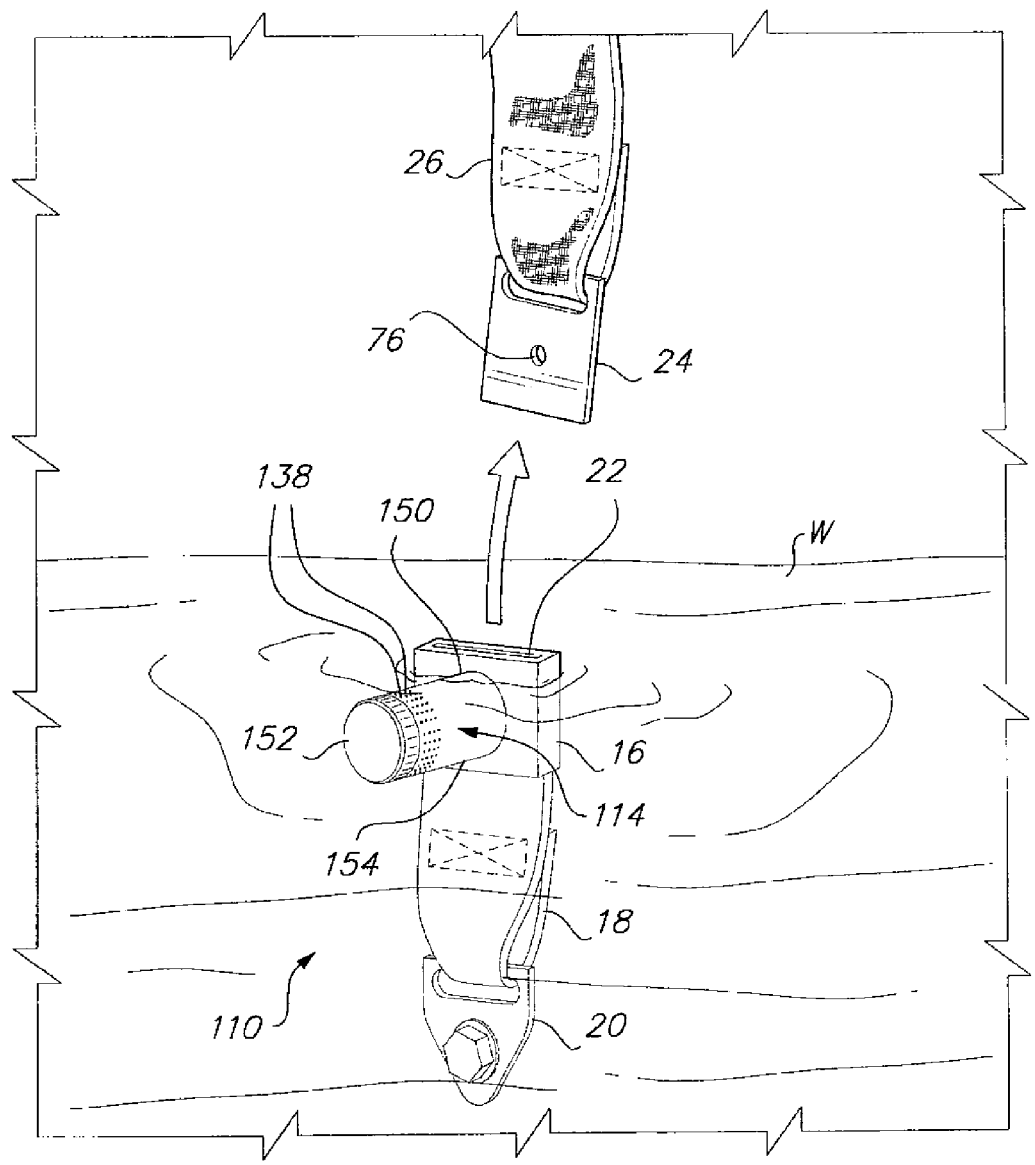
FIG. 4 is an exploded perspective view of an alternative embodiment of the safety belt release mechanism according to the present invention, similar to FIG. 1, showing its actuation.
Figure 5:
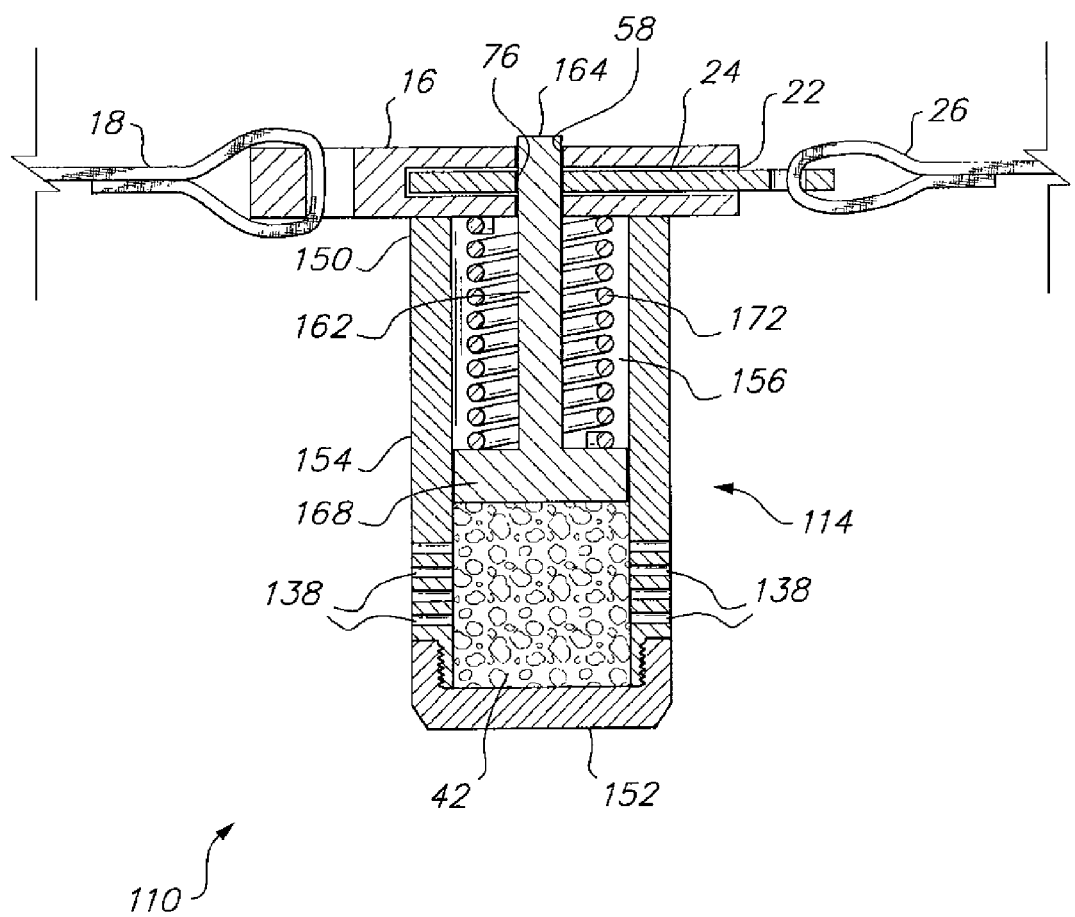
FIG. 5 is an elevation view in section of the mechanism of FIG. 4 in its armed state, illustrating various details thereof.
Figure 6:
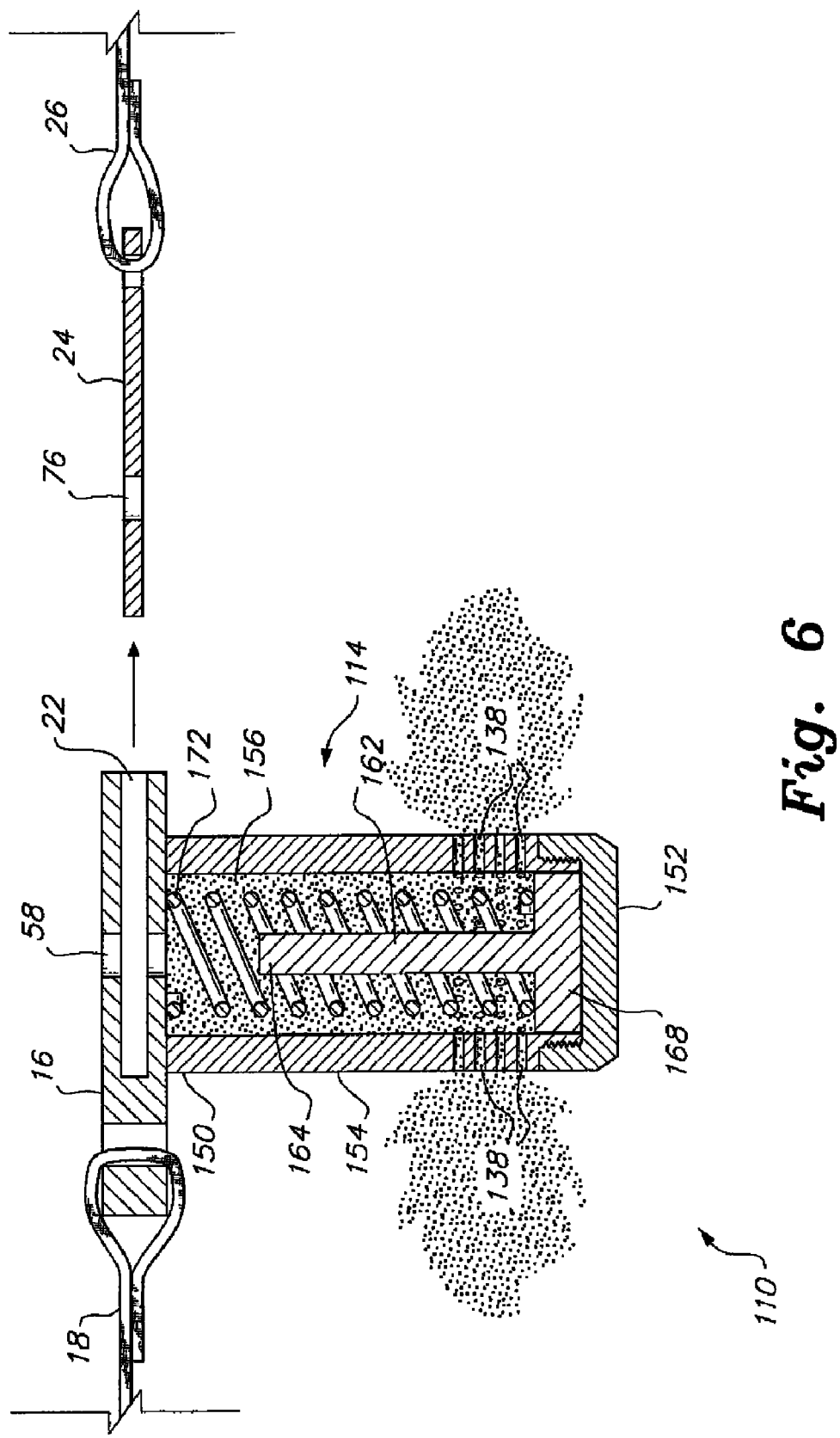
FIG. 6 is an elevation view in section of the mechanism of FIGS. 4 and 5 in its activated configuration, illustrating the operation thereof.

FIGS. 4 through 6 illustrate another embodiment of the safety belt release mechanism, wherein the pressurized gas cartridge is not used. Rather, the sensor and the actuator are combined into a single combination sensor and actuator unit that is attached directly to the latch assembly. However, the safety belt and latch components of each of the embodiments are substantially identical to one another.

The embodiment of the safety belt release mechanism 110 of FIGS. 4 through 6 includes a first or anchor safety belt component or portion 18 having a first latch component 16 extending therefrom, and an opposite second safety belt component or portion 26 having a second latch component 24 extending therefrom. The latch components 16 and 24 may have any shape, so long as the two latch components mate properly with one another. The first latch component 16 has a receptacle or slot 22 therein, and the second latch component 24 comprises a tongue that inserts directly into the slot 22 of the first latch component 16 to secure the two latch components together. Each latch component 16, 24 further has a latch pin passage extending therethrough, designated the first latch pin passage 58 and the second latch pin passage 76. The passages 58 and 76 are aligned concentrically with one another when the two latch components 16 and 24 are connected to one another, as shown in FIG. 5.

The combination sensor and actuator unit 114 is attached directly to the first latch component 16, and is substantially normal to the plane of the latch component 16. The sensor and actuator unit 114 is positioned concentrically with the latch pin passage 58 of its latch component 16. The sensor and actuator unit 114 comprises a housing having a first or spring housing end 150 defined by the surface of the first latch component 16 to which the unit 114 is attached, and an opposite second end 152. A wall 154 extends between the first end 150 and the opposite second end 152, the two ends 150, 152 and the wall 154 defining an interior chamber 156 extending between the two ends of the sensor and actuator unit 114.

The wall 154 of the sensor and actuator unit 114 includes at least one water passage 138 therethrough near the second end 152, but preferably includes a plurality of small passages 138. A water-soluble material 42, e.g., sodium bicarbonate or "baking soda," etc., is placed within the interior chamber 156 of the sensor and actuator unit 114 adjacent the second end 152 thereof. The material 42 may be in a loose powder or granular form, or in the form of small cakes or pellets, as desired.

A spring 172 is installed within the interior 156 of the sensor and actuator unit 114. The spring extends from the first end 150 of the sensor and actuator (i.e., the surface of the first latch component 16, to which the sensor and actuator unit 114 is attached) toward the opposite second end 152 and the water-soluble material 42 contained therein. A plunger 168 is installed between the spring 172 and the water-soluble material 44, the plunger 168 extending substantially completely across the interior 156 of the sensor and actuator and the spring 172 compressively bearing against the plunger 168. The plunger 168 is prevented from moving toward the second end 152 of the sensor and actuator unit 114 by the undissolved material 42 between the plunger 168 and the second end 152 of the sensor and actuator.

A latch pin 162 extends concentrically from the plunger 168 and through the sensor and actuator unit 114. The latch pin 162 has a latch-securing end 164 opposite the plunger 168. The latch-securing end 164 of the pin 162 passes through the two passages 58 and 76, respectively, of the first and second latch components 16 and 24 to secure them together when the water-soluble material 42 holds the plunger 168 and spring 172 in the position shown in FIG. 5.

The safety belt release mechanism 110 of FIGS. 4 through 6 operates somewhat similarly to the mechanism 10 of FIGS. 1 through 3, but combines aspects of the two major components 12 and 14 of the system 10 into a single combination sensor and actuator unit 114. Accordingly, the combination sensor and actuator unit 114 should be located where it will be immersed in water in the event of vehicle immersion, e.g., as shown in the environmental perspective view of FIG. 4. In the exemplary view of FIG. 4, the sensor and actuator unit 114 is installed directly upon the first latch component 16, which is, in turn, secured to a short anchor belt segment or component 18 that is attached to a safety belt anchor bracket 20 mounted low in the vehicle, e.g., to the lower frame or seat support structure, as shown in FIG. 1 of the drawings. Thus, if the vehicle remains upright even in relatively shallow water, the sensor and actuator unit will be positioned in the water W as the water enters the vehicle. Alternatively, a combination sensor and actuator 114 and its belt and latch components may be provided as links to the attachment of a shoulder harness or strap high in the vehicle, where actuation would occur in the event of a rollover into shallow water or immersion of the vehicle in deep water.

When the sensor and actuator 114 are immersed in water, the water will flow into the interior chamber 156 of the actuator 114 through the water passage(s) 138, thereby dissolving the water-soluble material 42 between the plunger 168 and the second end 152 of the sensor and actuator 114. When this occurs, the plunger 168 is free to move toward the second end 152 of the sensor and actuator, and is pushed in that direction by the compression of the spring 172. The movement of the plunger 168, thus, draws the attached latch pin 162 toward the second end 152 of the sensor and actuator 114, thereby pulling the latch-securing end 164 of the pin 162 from the passages 58 and 76 of the two latch components 16 and 24 to allow the second latch component 24 to slip from the first latch component 16 to free a person otherwise secured by the belt assembly, as shown in FIGS. 4 and 6 of the drawings.

In many cases, the vehicle may be repairable after immersion in water, particularly if the vehicle enters relatively shallow water with no other appreciable damage. Accordingly, it is preferred that the safety belt release mechanism 114 be reusable after replenishment of the water-soluble material 42. This may be accomplished by forming the second end 152 of the sensor and actuator 114 as a removable cap, e.g., by threaded attachment to the end of the wall 154 of the sensor and actuator, as shown in the views in section of FIGS. 5 and 6. The actuated unit 114 may be opened by removing the end cap 152 to access the interior chamber 156. The plunger 168 with its latch pin 162 and the spring 172 may then be withdrawn from the sensor and actuator 114, so that the interior of the sensor and actuator, the plunger and latch pin, and the spring may then be cleaned and dried. The two safety belt latch components 16 and 24 are reassembled, the spring 172 is reinstalled within the interior 156 of the sensor and actuator, and the plunger 168 is compressed against the spring 172 to insert the latch securing end 164 of the latch pin 162 through the concentric latch passages 58 and 76 of the assembled latch components 16 and 24. The portion of the internal chamber 156 adjacent to the second end of the sensor and actuator 114 is then refilled with water-soluble material 42, and the threaded end cap 152 is reinstalled on the sensor and actuator 114 to complete the assembly.

It is to be understood that the present invention is not limited to the embodiments described above, but encompasses any and all embodiments within the scope of the following claims.

We claim:

1. A safety belt release mechanism, comprising:
   a first safety belt portion;
   a first latch component extending from the first safety belt portion and including a receptacle therein;
   a second safety belt portion;
   a second latch component extending from the second safety belt portion, the first and second latch components being selectively and directly connected to one another, the first and second latch components each having a latch pin passage disposed therethrough, the latch pin passages being aligned concentrically with one another when the first and second latch components are connected to one another, wherein the second latch component comprises a tongue selectively latching in the receptacle of the first latch component; and
   an automated, water-activated sensor and actuator unit attached directly to the first latch component, wherein the sensor and actuator unit comprises:
   a housing having a first end defined by the first latch component, a second end opposite the first end, and a wall defining an interior chamber between the first end and the second end, the wall having at least one passage extending therethrough;
   a water-soluble material disposed within the interior chamber of the housing adjacent the second end thereof;
   a spring disposed within the interior chamber of the housing adjacent the first end thereof;
   a plunger disposed within the housing between the spring and the water-soluble material; and
   a latch pin extending from the plunger, the latch pin selectively extending from the first end of the housing.

2. A safety belt release mechanism, comprising:
   a sensor and actuator unit having a first end, a second end opposite the first end, and a wall defining an interior chamber between the first end and the second end, the wall having at least one passage extending therethrough;
   a water-soluble material disposed within the interior chamber of the sensor and actuator unit adjacent the first end thereof;
   a spring disposed within the interior chamber of the sensor and actuator unit adjacent the second end thereof;
   a plunger disposed within the sensor and actuator unit between the spring and the water- soluble material;
   a latch pin extending from the plunger, the latch pin selectively extending from the second end of the sensor and actuator unit; and
   a safety belt latch assembly attached to the sensor and actuator unit, the safety belt latch assembly defining the second end of the sensor and actuator unit.

3. The safety belt release mechanism according to claim 2, further including a first latch component and a second latch component, the first and second latch components selectively and directly connecting to one another to form the safety belt latch assembly, the first and second latch components each having a latch pin passage disposed therethrough, the latch pin passages being aligned concentrically with one another when the first and second latch components are connected to one another, the sensor and actuator unit being attached to the first latch component.

4. The safety belt release mechanism according to claim 2, wherein:
   the second end of the sensor and actuator body is removably attached thereto; and
   the safety belt latch assembly comprises a first latch component and a second latch component, the sensor and actuator unit extending from the first latch component substantially normal thereto.

5. The safety belt release mechanism according to claim 4, wherein the water-soluble material is replaceably disposed within the interior chamber of the sensor and actuator unit, the removably attached second end permitting access to the interior chamber.

6. The safety belt release mechanism according to claim 4, wherein the removably attached second end of the sensor and actuator unit comprises a threaded cap.

7. The safety belt release mechanism according to claim 2, wherein:
   the first latch component includes a receptacle therein; and
   the second latch component comprises a tongue selectively latching in the receptacle of the first latch component.

8. A safety belt release mechanism, comprising:
   a first latch component;
   a second latch component selectively and directly connected to the first latch component, each of the latch components having a latch pin passage disposed concentrically therethrough;
   an automated sensor and actuator unit attached to the first latch component, the sensor and actuator unit extending substantially normal thereto, the sensor and actuator unit having a latch attachment end attached to the first latch component, a spring housing portion adjacent the latch attachment end, a removable distal end opposite the latch attachment end, and a wall defining an interior chamber between the first latch component and the distal end;
   a latch pin disposed concentrically within the sensor and actuator unit, the latch pin having a latch-securing end extending from the latch attachment end of the sensor and actuator unit and a plunger opposite the latch-securing end thereof;
   a spring captured between the latch attachment end of the sensor and actuator unit and the plunger, the spring urging the plunger away from the latch attachment end of the sensor and actuator unit; and
   a water-soluble material disposed between the plunger and the removable distal end of the sensor and actuator unit.

9. The safety belt release mechanism according to claim 8, wherein the first and second latch components each have a latch pin passage disposed therethrough, the latch pin passages being aligned concentrically with one another when the first and second latch components are connected to one another.

10. The safety belt release mechanism according to claim 8, wherein the wall of the sensor and actuator unit includes at least one passage therethrough, the at least one passage communicating with the water-soluble material disposed within the sensor and actuator unit.

11. The safety belt release mechanism according to claim 8, wherein the water-soluble material is replaceably disposed within the interior chamber of the sensor and actuator unit, the removably attached second end permitting access to the interior chamber.

12. The safety belt release mechanism according to claim 8, wherein the removably attached second end of the sensor and actuator unit comprises a threaded cap.

13. The safety belt release mechanism according to claim 8, wherein:
the first latch component includes a receptacle therein; and
the second latch component comprises a tongue selectively latching in the receptacle of the first latch component.

14. A safety belt release mechanism, comprising:
a first safety belt portion;
a first latch component extending from the first safety belt portion and including a receptacle therein;
a second safety belt portion;
a second latch component extending from the second safety belt portion, the first and second latch components being selectively and directly connected to one another, the first and second latch components each having a latch pin passage disposed therethrough, the latch pin passages being aligned concentrically with one another when the first and second latch components are connected to one another, wherein the second latch component comprises a tongue selectively latching in the receptacle of the first latch component; and
an automated, water-activated sensor and actuator unit attached directly to the first latch component, wherein the sensor and actuator unit extends substantially normal to the first latch component, the mechanism further comprising:
a latch pin disposed concentrically within the sensor and actuator unit, the latch pin having a latch-securing end extending from the latch attachment end of the sensor and actuator unit and a plunger opposite the latch-securing end thereof;
a spring captured between the latch attachment end of the sensor and actuator unit and the plunger of the latch pin, the spring urging the plunger of the latch pin away from the latch attachment end of the sensor and actuator unit; and
a water-soluble material disposed between the plunger and the second end of the sensor and actuator unit.

15. The safety belt release mechanism according to claim 14, wherein:
the second end of the sensor and actuator unit is removably attached thereto; and
the water-soluble material is replaceably disposed within the interior chamber of the sensor and actuator unit, the removably attached second end permitting access to the interior chamber.

16. The safety belt release mechanism according to claim 15, wherein the removably attached second end of the sensor and actuator unit comprises a threaded cap.

* * * * *